US012770527B2

(12) United States Patent
Oh et al.

(10) Patent No.: US 12,770,527 B2
(45) Date of Patent: Oct. 20, 2026

(54) METHOD, SYSTEM, AND NON-TRANSITORY COMPUTER-READABLE RECORDING MEDIUM FOR ESTIMATING CONCEPT UNDERSTANDING

(71) Applicant: MATA EDU, INC., Seoul (KR)

(72) Inventors: Tae Hyoung Oh, Seoul (KR); Myunghoon Ahn, Seoul (KR); Du Seop Jung, Seongnam-si (KR); Sang Hoon Lee, Seoul (KR); Jaehyeong Ahn, Bucheon-si (KR)

(73) Assignee: MATA EDU, INC., Seoul (KR)

( * ) Notice: Subject to any disclaimer, the term of this patent is extended or adjusted under 35 U.S.C. 154(b) by 759 days.

(21) Appl. No.: 18/096,831

(22) Filed: Jan. 13, 2023

(65) Prior Publication Data

US 2023/0237924 A1 Jul. 27, 2023

(30) Foreign Application Priority Data

Jan. 13, 2022 (KR) ........................ 10-2022-0005553

(51) Int. Cl.
*G09B 7/00* (2006.01)
*G06Q 50/20* (2012.01)

(52) U.S. Cl.
CPC ............. *G09B 7/00* (2013.01); *G06Q 50/205* (2013.01)

(58) Field of Classification Search
CPC ........................................................ G09B 7/00
See application file for complete search history.

(56) References Cited

U.S. PATENT DOCUMENTS

| | | | | |
|---|---|---|---|---|
| 6,022,221 A * | 2/2000 | Boon | G09B 7/04 434/323 |
| 2009/0035733 A1* | 2/2009 | Meitar | G09B 7/00 434/118 |
| 2015/0010893 A1* | 1/2015 | Ritter | G09B 7/08 434/350 |
| 2015/0106704 A1* | 4/2015 | Towle | G09B 7/04 715/271 |
| 2017/0206456 A1* | 7/2017 | Stumbo | G09B 7/00 |
| 2019/0228673 A1* | 7/2019 | Dolsma | G09B 7/02 |
| 2019/0333400 A1* | 10/2019 | Saini | G09B 7/00 |

FOREIGN PATENT DOCUMENTS

| | | |
|---|---|---|
| KR | 1020180061998 A | 6/2018 |
| KR | 1020190082645 A | 7/2019 |
| KR | 1020190118815 A | 10/2019 |
| KR | 102075936 B1 | 3/2020 |

* cited by examiner

*Primary Examiner* — Peter R Egloff
(74) *Attorney, Agent, or Firm* — Dinsmore & Shohl LLP; Yongsok Choi, Esq.

(57) ABSTRACT

A method for estimating concept understanding is provided. The method includes the steps of: generating concept-specific correctness/incorrectness sequence data with respect to at least one user, with reference to data on a result of the at least one user solving at least one question associated with at least one concept; and estimating a first user's understanding of a first concept using a concept-specific understanding estimation model that is trained on the basis of the concept-specific correctness/incorrectness sequence data.

9 Claims, 3 Drawing Sheets

FIG. 3

310

| | Question 1 | Question 2 | Question 3 | Question 4 | Question 5 |
|---|---|---|---|---|---|
| First User | 1 | 1 | 0 | 0 | 1 |

320

| Question | Concept |
|---|---|
| Question 1 | A |
| Question 2 | B |
| Question 3 | C |
| Question 4 | A, B |
| Question 5 | B, C |

330

| | | | |
|---|---|---|---|
| A | 1 | 0 | |
| B | 1 | 0 | 1 |
| C | 0 | 1 | |

331

METHOD, SYSTEM, AND NON-TRANSITORY COMPUTER-READABLE RECORDING MEDIUM FOR ESTIMATING CONCEPT UNDERSTANDING

CROSS-REFERENCE TO RELATED APPLICATION

This application claims priority to Korean Patent Application No. 10-2022-0005553 filed on Jan. 13, 2022, the entire contents of which are herein incorporated by reference.

FIELD OF THE INVENTION

The present invention relates to a method, system, and non-transitory computer-readable recording medium for estimating concept understanding.

BACKGROUND

The educational environment is changing rapidly due to various changes in the surrounding environment caused by the utilization of the Internet and computers. Further, the educational content market is gradually growing due to educational fervor and fierce competition for entrance examinations.

Meanwhile, with the development of artificial intelligence technology, various learning contents and application techniques that support a user's learning based on the artificial intelligence technology are being developed and released as methods of supplementing the user's insufficient knowledge, departing from the traditional methods of providing learning solutions based on the knowledge or know-how of instructors or educational institutions.

As an example of the related conventional techniques, a technique has been introduced which provides a learning material including one or more question sections, an answer sheet including solutions and correct answers to one or more questions, and a concept summary section in which concepts for the one or more questions are summarized, wherein the answer sheet includes a correct answer check part for checking whether the answer to each question is correct, a correct answer percentage calculation part for calculating a correct answer percentage for each question, and other parts related to frequencies of questions.

As another example of the related conventional techniques, a learning system has been introduced in which a user's knowledge level is inferred through a learning diagnosis based on artificial intelligence, and learning is carried out at a difficulty level according to the knowledge level.

However, according to the techniques introduced so far as well as the above-described conventional techniques, a learning concept required to solve a learning question provided to a user who carries out learning, a type of the learning question (e.g., a basic question or an advanced question), and the like are provided as a package equally to each user, without considering the learning situation or learning context of the user, so that it is difficult to recognize, for example, which learning concept the user lacks with respect to the learning question or whether the type of the learning question is appropriate for the user (e.g., whether the question should be considered as a basic question or an advanced question in view of the user's knowledge). That is, there occurs a problem that the user's learning efficiency is reduced because the user's learning is carried out without adequate consideration of the user's degree of knowledge and concept acquisition.

SUMMARY OF THE INVENTION

One object of the present invention is to solve all the above-described problems in the prior art.

Another object of the invention is to generate concept-specific correctness/incorrectness sequence data with reference to data on a result of solving learning questions provided to a user, thereby building a concept understanding estimation model that reflects time-based weights and learning experiences of multiple users with respect to concepts, and using the model to estimate the user's understanding of each concept.

Yet another object of the invention is to estimate a user's understanding of a concept that the user has not encountered, corresponding to a learning question to be provided to the user.

Still another object of the invention is to estimate a user's understanding of each concept and make the user clearly recognize of which concept the user lacks understanding, so that the user may efficiently determine the direction of learning.

The representative configurations of the invention to achieve the above objects are described below.

According to one aspect of the invention, there is provided a method for estimating concept understanding, the method comprising the steps of: generating concept-specific correctness/incorrectness sequence data with respect to at least one user, with reference to data on a result of the at least one user solving at least one question associated with at least one concept; and estimating a first user's understanding of a first concept using a concept-specific understanding estimation model that is trained on the basis of the concept-specific correctness/incorrectness sequence data.

According to another aspect of the invention, there is provided a system for estimating concept understanding, the system comprising: a sequence data generation unit configured to generate concept-specific correctness/incorrectness sequence data with respect to at least one user, with reference to data on a result of the at least one user solving at least one question associated with at least one concept; and a concept understanding estimation unit configured to estimate a first user's understanding of a first concept using a concept-specific understanding estimation model that is trained on the basis of the concept-specific correctness/incorrectness sequence data.

In addition, there are further provided other methods and systems to implement the invention, as well as non-transitory computer-readable recording media having stored thereon computer programs for executing the methods.

According to the invention, it is possible to generate concept-specific correctness/incorrectness sequence data with reference to data on a result of solving learning questions provided to a user, thereby building a concept understanding estimation model that reflects time-based weights and learning experiences of multiple users with respect to concepts, and using the model to estimate the user's understanding of each concept.

According to the invention, it is possible to estimate a user's understanding of a concept that the user has not encountered, corresponding to a learning question to be provided to the user.

According to the invention, it is possible to estimate a user's understanding of each concept and make the user clearly recognize of which concept the user lacks understanding, so that the user may efficiently determine the direction of learning.

BRIEF DESCRIPTION OF THE DRAWINGS

FIG. 3 illustratively shows how to generate concept correctness/incorrectness sequence data according to one embodiment of the invention.

DETAILED DESCRIPTION OF THE INVENTION

Figure 1:
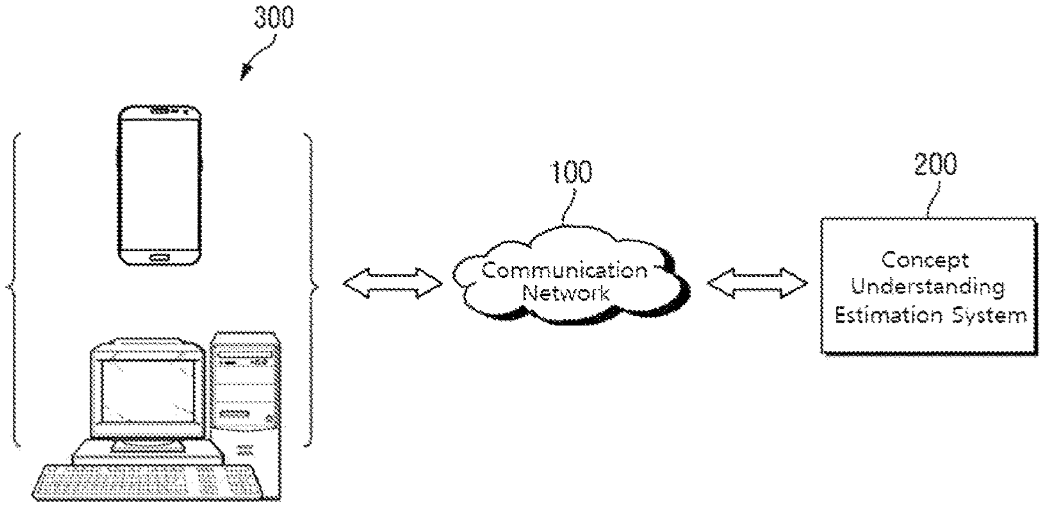
FIG. 1 schematically shows the configuration of an entire system for estimating concept understanding according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Herein, sequence data may refer to a series of interrelated pieces of data. For example, the sequence data may refer to time-series data, which is data recorded over time, and text data, which has a contextual order over time. Specifically, the sequence data may include first sequence data generated at a first time point and second sequence data generated at a second time point that follows the first time point by a predetermined amount of time. Further, according to one embodiment of the invention, the sequence data may contribute to predicting a probability distribution of future occurrences of data.

Herein, a concept may refer to a unit of knowledge required to understand or solve a learning question. For example, the knowledge unit or learning concept may encompass a table of contents, a curriculum unit, and the like in a curriculum.

Herein, a question may refer to a problem associated with at least one concept. The question according to one embodiment of the invention may include not only a conventional basic question provided to acquire a learning concept, but also a supplemental question that may be additionally provided together with the basic question on the basis of the user's understanding of the concept. For example, according to one embodiment of the invention, the types of the supplemental question may include a "concept-as-is" question that utilizes a single learning concept in which the user is determined to be weak, a "concept-plus" question that utilizes a learning concept different from a learning concept in which the user is determined to be weak, and the like.

Configuration of the Entire System

FIG. 1 schematically shows the configuration of the entire system for estimating concept understanding according to one embodiment of the invention.

As shown in FIG. 1, the entire system according to one embodiment of the invention may comprise a communication network 100, a concept understanding estimation system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi Direct communication, Long Term Evolution (LTE) communication, Bluetooth communication (e.g., Bluetooth Low Energy (BLE) communication), infrared communication, and ultrasonic communication.

Next, the concept understanding estimation system 200 according to one embodiment of the invention may communicate with the device 300 to be described below via the communication network 100, and may function to generate concept-specific correctness/incorrectness sequence data with respect to at least one user, with reference to data on a result of the at least one user solving at least one question associated with at least one concept, and to estimate a first user's understanding of a first concept using a concept-specific understanding estimation model that is trained on the basis of the concept-specific correctness/incorrectness sequence data.

The configuration and functions of the concept understanding estimation system 200 according to the invention will be discussed in more detail below. Meanwhile, the above description is illustrative although the concept understanding estimation system 200 has been described as above, and it will be apparent to those skilled in the art that at least a part of the functions or components required for the concept understanding estimation system 200 may be implemented or included in the device 300 to be described below or an external system (not shown), as necessary.

Next, the device 300 according to one embodiment of the invention is digital equipment that may function to connect to and then communicate with the concept understanding estimation system 200 via the communication network 100, and any type of portable digital equipment having a memory means and a microprocessor for computing capabilities, such as a smart phone and a tablet PC, may be adopted as the device 300 according to the invention.

Meanwhile, the device 300 according to one embodiment of the invention may include an application for supporting the functions of estimating concept understanding according to the invention. The application may be downloaded from the concept understanding estimation system 200 or an external application distribution server (not shown).

Configuration of the Concept Understanding Estimation System

Hereinafter, the internal configuration of the concept understanding estimation system 200 crucial for implementing the invention and the functions of the respective components thereof will be discussed.

Figure 2:
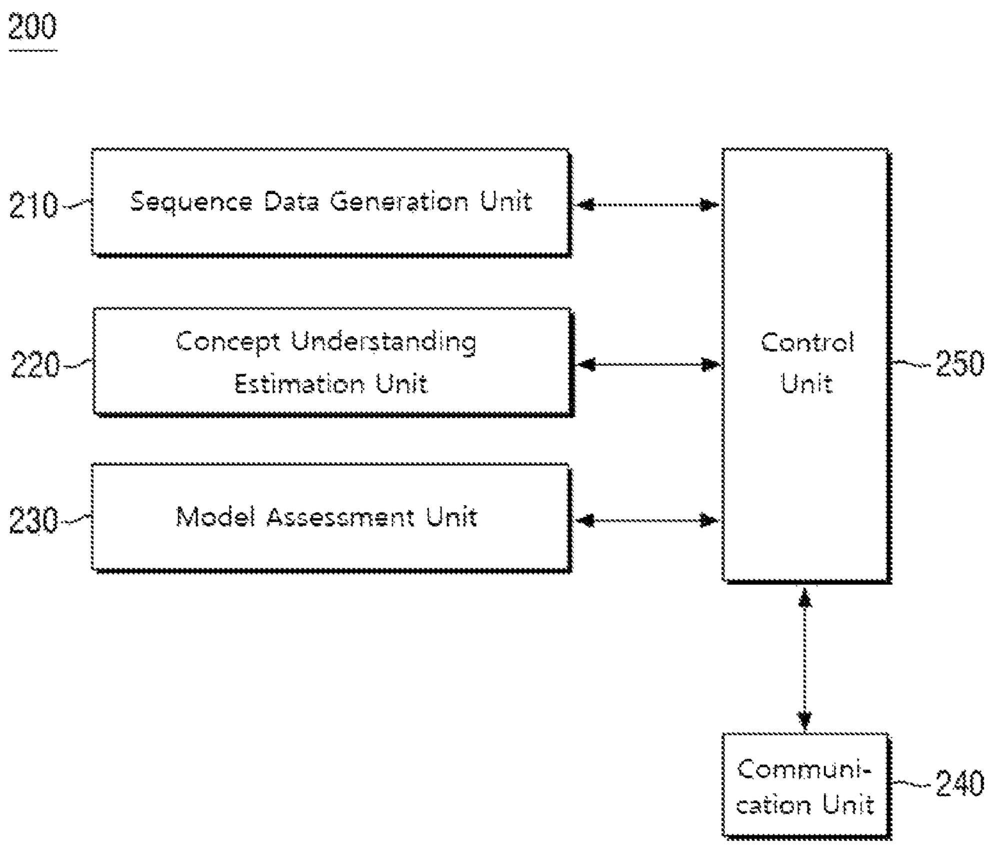
FIG. 2 specifically shows the internal configuration of a concept understanding estimation system according to one embodiment of the invention.

FIG. 2 specifically shows the internal configuration of the concept understanding estimation system 200 according to one embodiment of the invention.

The concept understanding estimation system 200 according to one embodiment of the invention may be digital equipment having a memory means and a microprocessor for computing capabilities. As shown in FIG. 2, the concept understanding estimation system 200 may comprise a sequence data generation unit 210, a concept understanding estimation unit 220, a model assessment unit 230, a communication unit 240, and a control unit 250. According to one embodiment of the invention, at least some of the sequence data generation unit 210, the concept understanding estimation unit 220, the model assessment unit 230, the communication unit 240, and the control unit 250 may be program modules that communicate with an external system. The program modules may be included in the concept understanding estimation system 200 in the form of operating systems, application program modules, or other program modules, while they may be physically stored in a variety of commonly known storage devices. Further, the program modules may also be stored in a remote storage device that may communicate with the concept understanding estimation system 200. Meanwhile, such program modules may include, but are not limited to, routines, subroutines, programs, objects, components, and data structures for performing specific tasks or executing specific abstract data types according to the invention as will be described below.

First, the sequence data generation unit 210 according to one embodiment of the invention may generate concept-specific correctness/incorrectness sequence data with respect to at least one user, with reference to data on a result of the at least one user solving at least one question associated with at least one concept.

According to one embodiment of the invention, the concept-specific correctness/incorrectness sequence data may be generated by preprocessing for performing concept-specific categorization with respect to the data on the result of solving the at least one question associated with the at least one concept.

For example, according to one embodiment of the invention, the concept-specific correctness/incorrectness sequence data may be generated by preprocessing data on a result of solving questions to indicate correctness or incorrectness for each concept included in a question solved in a time-series manner by each user. According to one embodiment of the invention, the concept-specific categorization for the at least one question may be performed on the basis of concept-specific tagging made by an expert in the relevant field. Further, according to another embodiment of the invention, the concept-specific categorization for the at least one question may be performed on the basis of a natural language processing (NLP) algorithm and a clustering algorithm.

Specifically, according to one embodiment of the invention, the concept-specific categorization for the at least one question may be performed by tagging the at least one question by concept with reference to a lookup table that is pre-created by the expert to categorize concepts (e.g., which may refer to a lookup table in which concepts are pre-categorized for each question). Further, according to one embodiment of the invention, the concept-specific categorization for the at least one question may be performed with reference to the lookup table using a NLP algorithm and a clustering algorithm.

Meanwhile, a concept-specific understanding estimation model according to one embodiment of the invention may be trained on the basis of the concept-specific correctness/incorrectness sequence data.

For example, the concept-specific understanding estimation model according to one embodiment of the invention may be trained using a Bayesian knowledge tracing algorithm. Herein, the Bayesian knowledge tracing algorithm may refer to an algorithm that probabilistically models a learner's cognitive processes during the course of learning to trace the learner's level of knowledge acquisition at a given time point.

According to one embodiment of the invention, the concept-specific understanding estimation model may be trained with respect to a plurality of parameters (e.g., pre-existing knowledge, acquired knowledge, a guess, and a mistake) on the basis of the concept-specific correctness/incorrectness sequence data. According to one embodiment of the invention, the pre-existing knowledge indicates a probability that the user already possesses the knowledge, the acquired knowledge indicates a probability that the user fully understands the knowledge by solving a question, the guess indicates a probability that the user guesses a correct answer to the question without possessing the knowledge, and the mistake indicates a probability that the user possesses the knowledge but makes a mistake. Further, according to one embodiment of the invention, the plurality of parameters may be updated on the basis of an expectation maximization algorithm.

According to one embodiment of the invention, the concept-specific understanding estimation model may be trained such that the concept-specific understanding is estimated by assigning a greater weight to second sequence data generated at a second time point (e.g., following a first time point by a predetermined amount of time) than to first sequence data generated at the first time point.

For example, according to one embodiment of the invention, the second sequence data may be assigned a greater weight than the first sequence data on the basis of a weighting function.

More specifically, the weighting function according to one embodiment of the invention may be expressed as Equation 1 below.

$$w_{tl} = \frac{d^{t-l}}{\sum_{l=1}^{t-1} d^{t-l}} \in (0, 1] \qquad \text{(EQ. 1)}$$

Here, $w_{tl}$ denotes a weight assigned to the $l^{th}$ sequence data out of t pieces of sequence data, and d denotes a user-defined constant. For example, d may be set to 0.7. As another example, d may be set to a value that is observed to have the smallest error during the course of assessing the concept-specific understanding estimation model by the model assessment unit to be described below.

This allows the concept-specific understanding estimation model to more precisely estimate the user's concept understanding by assigning a greater weight to more recent sequence data, reflecting the degree of forgetting a concept over time after solving a question.

Further, the conventional Bayesian knowledge tracing algorithm is based on the assumption that a user does not forget knowledge once learned, and has a limitation that individual characteristics (e.g., difficulty) of questions cannot be considered.

According to one embodiment of the invention, the concept-specific understanding estimation model may be trained with respect to the plurality of parameters with reference to the weighted concept-specific correctness/incorrectness sequence data, so that the user's concept understanding may be more precisely identified compared to the conventional Bayesian knowledge tracing algorithm. Meanwhile, the concept-specific understanding estimation model according to the invention is not necessarily limited to being trained by the above algorithm, and the training algorithm may be diversely changed as long as the objects of the invention may be achieved.

According to the invention, a concept understanding estimation model may be built not only using the above concept-specific correctness/incorrectness sequence data, but also using concept-specific correctness/incorrectness sequence data of two or more users so that the model may be applied to the two or more users. Therefore, the concept understanding estimation model may reflect learning experiences of multiple learners, thereby providing concept understanding estimation results with high reliability and universality.

Next, the concept understanding estimation unit 220 according to one embodiment of the invention may estimate a first user's understanding of a first concept using a concept-specific understanding estimation model that is trained on the basis of the concept-specific correctness/incorrectness sequence data. Specifically, according to one embodiment of the invention, a user's understanding of a concept (or concept understanding) may refer to a probability that the user knows the concept at a given time point (e.g., at time t+1) on the basis of the concept-specific correctness/incorrectness sequence data (e.g., the data through time t).

Further, according to one embodiment of the invention, when a particular user has never solved a question about a particular concept, the user's understanding of the concept may be set to 0.5.

Meanwhile, according to one embodiment of the invention, the concept understanding estimation unit 220 may estimate the user's understanding of a concept that the user has not encountered.

For example, according to one embodiment of the invention, the concept understanding estimation unit 220 may estimate a first user's understanding of a second concept on the basis of a second user's understanding of the second concept.

More specifically, according to one embodiment of the invention, the concept understanding estimation unit 220 may assess learning levels of the first user and the second user by comparing concept understanding of the first user and the second user with respect to a plurality of concepts that the first user has already encountered. Next, the first user's understanding of the second concept may be estimated on the basis of the assessed learning levels of the first and second users and the second user's concept correctness/incorrectness sequence data for the second concept.

As another example, according to one embodiment of the invention, the concept understanding estimation unit 220 may estimate the user's understanding of a concept that the user has not encountered by assessing the similarity between the concept that the user has not encountered and a concept that the user has already solved.

For example, the concept understanding estimation unit 220 may apply a simulated annealing algorithm to a first question containing a second concept not encountered by the user and a second question containing a first concept encountered by the user, thereby assessing the similarity between the first and second concepts. According to one embodiment of the invention, on the basis of the assessed similarity between the concepts, the user's understanding of the concept not encountered by the user may be estimated from the user's understanding of the concept encountered by the user.

Meanwhile, according to one embodiment of the invention, the concept understanding estimation unit 220 may estimate the user's understanding of a concept not encountered by the user on the basis of a collaborative filtering algorithm.

For example, the concept understanding estimation unit 220 may estimate the user's understanding of the concept not encountered by the user, using a matrix factorization algorithm on the concept-specific correctness/incorrectness sequence data represented in a matrix structure with respect to a plurality of concepts (e.g., which may be a first concept encountered by the user and a second concept not encountered by the user) and results of a plurality of users solving questions. As another example, since the times at which the concept understanding is estimated for the plurality of users are different, the concept understanding estimation unit 220 may estimate the user's understanding of the concept not encountered by the user using a temporal dynamics algorithm.

Next, according to one embodiment of the invention, the model assessment unit 230 may assess the concept-specific understanding estimation model using a result of estimating the user's concept understanding.

For example, the model assessment unit 230 according to one embodiment of the invention may assess the concept-specific understanding estimation model on the basis of a k-fold cross validation algorithm. Specifically, the k-fold cross validation algorithm according to one embodiment of the invention refers to an algorithm for assessing the model by successively alternating training and validation steps, such that all the concept correctness/incorrectness sequence data is assessed. Meanwhile, the model assessment unit 230 according to the invention is not necessarily limited to assessing the model by the above algorithm, and the assessment algorithm for optimizing the model may be diversely changed as long as the objects of the invention may be achieved.

Next, the communication unit 240 according to one embodiment of the invention may function to enable data transmission/reception from/to the sequence data generation unit 210, the concept understanding estimation unit 220, and the model assessment unit 230.

Lastly, the control unit 250 according to one embodiment of the invention may function to control data flow among the sequence data generation unit 210, the concept understanding estimation unit 220, the model assessment unit 230, and the communication unit 240. That is, the control unit 250 according to the invention may control data flow into/out of the concept understanding estimation system 200 or data flow among the respective components of the concept understanding estimation system 200, such that the sequence data generation unit 210, the concept understanding estimation unit 220, the model assessment unit 230, and the communication unit 240 may carry out their particular functions, respectively.

FIG. 3 illustratively shows how to generate concept correctness/incorrectness sequence data according to one embodiment of the invention.

Referring to FIG. 3, according to one embodiment of the invention, concept-specific correctness/incorrectness sequence data 330 is generated as follows. According to one embodiment of the invention, it may be assumed that a first user solves five questions in a time-series manner, and data 310 on a result thereof (e.g., which may be represented as 1 for a correct answer and 0 for an incorrect answer) is represented as [1, 1, 0, 0, 1].

Further, according to one embodiment of the invention, preprocessing may be performed in which the data 310 on the result of the user solving the questions is categorized by concept. For example, with reference to a lookup table 320, learning concepts associated with the first to fifth questions may be categorized as A, B, C, A and B, and B and C, respectively. As another example, the concept-specific categorization for the questions may be performed with reference to the lookup table 320 using a NLP algorithm and a clustering algorithm.

Furthermore, according to one embodiment of the invention, the concept-specific correctness/incorrectness sequence data 330 may be generated on the basis of the data 310 on the result of the user solving the questions and the concept-specific categorization for the questions. For example, the concept-specific correctness/incorrectness sequence data may be represented as [1, 0] for the concept A, [1, 0, 1] for the concept B, and [0, 1] for the concept C.

As another example, the concept-specific correctness/incorrectness sequence data 330 may be represented in a matrix structure in connection with the concepts and the result of solving the questions.

Meanwhile, according to one embodiment of the invention, a more recently solved question may be assigned a greater weight in the concept-specific correctness/incorrectness sequence data 330. For example, with respect to the concept B associated with the fourth and fifth questions, the fifth question is a more recently solved question than the fourth question according to the order of the time series, and thus in estimating the concept understanding, a greater weight may be assigned to 1 than to 0 in correctness/incorrectness sequence data 331 for the concept B.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for estimating concept understanding, the system comprising one or more processors and the method comprising the steps of:

by the one or more processors, performing concept-specific categorization for at least one question associated with at least one concept with reference to a lookup table using a natural language processing (NLP) algorithm and a clustering algorithm;

by the one or more processors, generating concept-specific correctness/incorrectness sequence data represented in a matrix structure with respect to at least one user, with reference to data on a result of the at least one user solving the at least one question and the concept-specific categorization for the at least one question;

by the one or more processors, training a concept-specific understanding estimation model on the basis of the concept-specific correctness/incorrectness sequence data in the matrix structure; and by the one or more processors, estimating a first user's understanding of a first concept using the trained concept-specific understanding estimation model, wherein the concept-specific correctness/incorrectness sequence data includes first sequence data generated at a first time point and second sequence data generated at a second time point that follows the first time point by a predetermined amount of time, wherein the concept-specific understanding estimation model is trained such that the concept-specific understanding is estimated by assigning a greater weight to the second sequence data generated at the second time point than to the first sequence data generated at the first time point, wherein a weight assigned to $l^{th}$ sequence data out of a total of t pieces of sequence data is determined on the basis of a value obtained by dividing a $t-l^{th}$ power of a specific constant by a geometric series from a first term to a $(t-1)^{th}$ term for the $t-l^{th}$ power of the specific constant, and wherein in the estimating step, similarity between a concept not encountered by the first user and a concept encountered by the first user is assessed, and the first user's understanding of the concept not encountered by the first user is estimated from the first user's understanding of the concept encountered by the first user on the basis of the similarity.

2. The method of claim 1, wherein the concept-specific understanding estimation model is trained using a Bayesian knowledge tracing algorithm.

3. The method of claim 1, further comprising the step of: by the one or more processors, assessing the concept-specific understanding estimation model using a result of the estimation.

4. A non-transitory computer-readable recording medium having stored thereon a computer program for executing the method of claim 1.

5. The method of claim 1, wherein in the estimating step, the first user's understanding of the concept not encountered by the first user is further estimated using a matrix factorization algorithm on the concept-specific correctness/incorrectness sequence data represented in the matrix structure with respect to a plurality of concepts including the concept encountered by the first user and the concept not encountered by the first user.

6. A system for estimating concept understanding, the system comprising one or more processors configured to:

perform concept-specific categorization for at least one question associated with at least one concept with reference to a lookup table using a natural language processing (NLP) algorithm and a clustering algorithm;

generate concept-specific correctness/incorrectness sequence data represented in a matrix structure with respect to at least one user, with reference to data on a result of the at least one user solving the at least one question and the concept-specific categorization for the at least one question;

train a concept-specific understanding estimation model on the basis of the concept-specific correctness/incorrectness sequence data in the matrix structure; and estimate a first user's understanding of a first concept using the trained concept-specific understanding estimation model, wherein the concept-specific correctness/incorrectness sequence data includes first sequence data generated at a first time point and second sequence data generated at a second time point that follows the first time point by a predetermined amount of time, and wherein the concept-specific understanding estimation model is trained such that the concept-specific understanding is estimated by assigning a greater weight to the second sequence data generated at the second time point than to the first sequence data generated at the first time point, wherein a weight assigned to $l^{th}$ sequence data out of a total of t pieces of sequence data is determined on the basis of a value obtained by dividing a $t-l^{th}$ power of a specific constant by a geometric series from a first term to a $(t-1)^{th}$ term for the $t-l^{th}$ power of the specific constant, and wherein the one or more processors are configured to assess similarity between a concept not encountered by the first user and a concept encountered by the first user, and estimate the first user's understanding of the concept not encountered by the first user from the first user's understanding of the concept encountered by the first user on the basis of the similarity.

7. The system of claim 6, wherein the concept-specific understanding estimation model is trained using a Bayesian knowledge tracing algorithm.

8. The system of claim 6, wherein the one or more processors are configured to assess the concept-specific understanding estimation model using a result of the estimation.

9. The system of claim 6, wherein the one or more processors are configured to further estimate the first user's understanding of the concept not encountered by the first user using a matrix factorization algorithm on the concept-specific correctness/incorrectness sequence data represented in the matrix structure with respect to a plurality of concepts including the concept encountered by the first user and the concept not encountered by the first user.

* * * * *